(12) United States Patent
Xiao et al.

(10) Patent No.: US 9,072,109 B2
(45) Date of Patent: Jun. 30, 2015

(54) COLLISION DETECTION AND BITWISE ARBITRATION IN MULTICARRIER WIRELESS NETWORKS

(71) Applicant: Board of Trustees of Michigan State University, East Lansing, MI (US)

(72) Inventors: Li Xiao, Okemos, MI (US); Pei Huang, East Lansing, MI (US); Xi Yang, East Lansing, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 177 days.

(21) Appl. No.: 13/803,758

(22) Filed: Mar. 14, 2013

(65) Prior Publication Data

US 2014/0269524 A1 Sep. 18, 2014

(51) Int. Cl.
| | |
|---|---|
| *H04W 74/08* | (2009.01) |
| *H04L 5/00* | (2006.01) |
| *H04L 12/413* | (2006.01) |
| *H04L 1/00* | (2006.01) |
| *H04L 12/26* | (2006.01) |
| *H04W 74/00* | (2009.01) |
| *H04B 1/713* | (2011.01) |
| *H04B 1/7136* | (2011.01) |
| *H04B 7/08* | (2006.01) |

(52) U.S. Cl.
CPC ......... *H04W 74/0825* (2013.01); *H04L 5/0053* (2013.01)

(58) Field of Classification Search
CPC .. H04B 72/446; H04B 72/1242; H04B 16/14; H04L 5/0053; H04L 74/825; H04L 74/833; H04W 74/0825; H04W 74/0808; H04W 74/0816; H04W 74/0833; H04W 74/0858
USPC ............... 370/203–211, 329, 334, 445–448; 455/512, 435.3, 509, 450
See application file for complete search history.

(56) References Cited

U.S. PATENT DOCUMENTS

| | | | |
|---|---|---|---|
| 5,164,942 A | 11/1992 | Kamerman et al. | |
| 8,279,785 B2 | 10/2012 | Ji | |

(Continued)

OTHER PUBLICATIONS

Souvik Sen et al "No Time to Countdown: Migrating Backoff to the Frequency Domain", MobiCom' 11, (2011).

(Continued)

*Primary Examiner* — Un C Cho
*Assistant Examiner* — Peian Lou
(74) *Attorney, Agent, or Firm* — Harness, Dickey & Pierce, P.L.C.

(57) ABSTRACT

A method is provided for detecting collisions and arbitrating channel access in a multicarrier wireless network. The method includes: transmitting a collision probe over a data channel using a first antenna of a first communication device, where the collision probe is derived from a binary codeword comprised of k bits and each bit of the binary codeword is transmitted using a different subcarrier frequency of the data channel; listening for a signal on the data channel using a second antenna of the first communication device and concurrently with the transmission of the collision probe; comparing a collision probe received on the data channel from another communication device with the collision probe transmitted on the data channel by the first communication device; detecting a collision on the data channel based on the comparison step; and arbitrating access to the data channel upon detecting a collision on the data channel.

20 Claims, 12 Drawing Sheets

(56) References Cited

U.S. PATENT DOCUMENTS

| | | | |
|---|---|---|---|
| 2006/0050625 A1* | 3/2006 | Krasner | 370/208 |
| 2009/0225876 A1 | 9/2009 | Sung et al. | |
| 2010/0165952 A1* | 7/2010 | Sung et al. | 370/335 |
| 2010/0217789 A1* | 8/2010 | Saitoh et al. | 708/255 |
| 2010/0234016 A1 | 9/2010 | Palanki et al. | |
| 2012/0106371 A1 | 5/2012 | Abraham et al. | |

OTHER PUBLICATIONS

Klair, Dheeraj K., et al.; "A Novel Anti-Collision Protocal for Energy Efficient Indentification and Monitoring in RFID-Enhanced WSNs," Proceedings of the IEEE 17th International Conference on Computer Communications and Networks, Aug. 3, 2008, pp. 1-8.

* cited by examiner

COLLISION DETECTION AND BITWISE ARBITRATION IN MULTICARRIER WIRELESS NETWORKS

FIELD

The present disclosure relates to techniques for detecting collisions and arbitrating channel access in a multicarrier wireless network.

BACKGROUND

Advances in Quadrature Amplitude Modulation (QAM), Orthogonal Frequency-Division Multiplexing (OFDM), channel bonding, and Multiple-Input Multiple-Output (MIMO) are pushing wireless PHY data rates toward a new milestone. The fast increasing data rates make MAC overhead rise from a minor factor to a major factor that affects the efficiency of contention-based wireless communication. Taking Wi-Fi as an example, the transmission time for a 1500 byte packet has been reduced from 12 ms at 1 Mbps to 20 μs at 600 Mbps in a dozen years. The transmission time will be further shortened with higher Gbps PHY data rates supported in ongoing standardization of 802.11ac and 802.11ad. The average channel access overhead, however, stays at the same order of magnitude as before. In 802.11n, the average channel access overhead is 101.5 μs, which is about 5 times of the data transmission time for a 1500 byte packet at 600 Mbps. Although frame aggregation can reduce the relative impact of channel access overhead, it does not work well for non-bulk data flows or traffic that has stringent deadline requirements (e.g., short HTTP flows and VoIP packets).

In contention-based wireless networks, Carrier Sense Multiple Access/Collision Avoidance (CSMA/CA) is widely adopted to reduce collisions between nodes. Each node defers its transmission for a random number of slots to avoid collision and each slot must be long enough for accurate detection of busy channel. The random backoff is necessary because collision detection was thought to be impossible in wireless communication. Without collision detection, nodes cannot start transmission immediately when the channel is detected to be idle; otherwise, none of them can succeed transmission. The reason that collision detection was impractical is because even if a node could listen on the channel while transmitting, the strong self-interference would mask all other signals on the air. However, recent advances in self-interference cancellation have made full duplex wireless communication possible. This allows transmitters to parallelize transmission and detection. By designing different preambles before data transmission, different contention resolution schemes have been proposed.

WiFi-Nano relies on cross-correlation to compute the start time of a preamble transmission. It still needs random backoff to spread out nodes' transmissions but the random backoff time is shortened by reducing the backoff slot duration to 800 ns. Although the adoption of tiny time slots in random backoff helps to reduce channel access overhead, the random backoff can no longer desynchronize hidden terminals. As a result, hidden terminals may keep colliding with each other. In addition, a weak signal can be discovered only after all stronger transmissions are aborted but transmissions initiated in the same time slot are aborted probabilistically. Therefore, the time used to resolve a collision is uncertain and it is possible that all nodes abort their transmissions in a contention.

Full duplex wireless communication also motivates researchers to migrate random backoff from the time domain to the frequency domain using the non-contiguous OFDM (NC-OFDM) technique. The method is to let a node occupy only one randomly selected subcarrier for preamble transmission. Contending nodes learn each other's random number and back off accordingly. In practice, the collision probability is high because only a few subcarriers are available for contention resolution and there is no complementary mechanism like binary exponential backoff (BEB) that can be used to reduce the probability that two nodes will choose the same subcarrier.

This section provides background information related to the present disclosure which is not necessarily prior art.

SUMMARY

An improved method is presented for detecting collisions and arbitrating channel access in a multicarrier wireless network. The method includes: transmitting a collision probe over a data channel using a first antenna of a first communication device, where the collision probe is derived from a binary codeword comprised of k bits and each bit of the binary codeword is transmitted using a different subcarrier frequency of the data channel; listening for a signal on the data channel using a second antenna of the first communication device and concurrently with the transmission of the collision probe; comparing a collision probe received on the data channel from another communication device with the collision probe transmitted on the data channel by the first communication device; detecting a collision on the data channel based on the comparison step; and arbitrating access to the data channel upon detecting a collision on the data channel.

In one aspect, detecting collisions further includes: detecting an idle condition on a data channel of a shared transmission medium, where the data channel is divided into a plurality of subcarrier frequencies; generating a collision probe from a binary codeword comprised of k bits, where one or more values of the binary codeword correlate to a signal magnitude of zero; transmitting the collision probe over the data channel by a first communication device, such that each bit of the binary codeword is transmitted using a different subcarrier frequency of the data channel; receiving, concurrently with the transmission of the collision probe, an incoming signal from a second communication device; and identifying a collision on the data channel based on presence of a signal on a subcarrier frequency of the incoming signal whose corresponding bit value of the first communication device in the collision probe is zero.

In another aspect, the collision probe may be generated by selecting a random number from a range of values; translating the random number to a binary codeword comprised of k bits, where a bit value of one correlates to a signal magnitude greater than zero and a bit value of zero correlates to a signal magnitude of zero; mapping each bit of the binary codeword to a different subcarrier frequency of the data channel, where the data channel is divided into k subcarrier frequencies; modulating signals in each of the subcarriers frequencies of the data channel using a bit value from the mapped bit of the binary codeword; and transmitting the modulated signals over the data channel by a first communication device.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
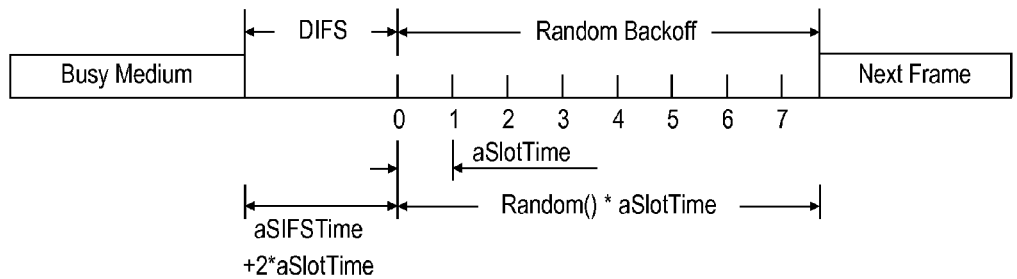
FIG. 1 is a diagram illustrating carrier sense multiple access with collision avoidance.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The fundamental channel access method of the IEEE 802.11 MAC is a distributed coordination function (DCF) that relies on carrier sense multiple access/collision avoidance (CSMA/CA). Due to physical constraints (e.g., processing delay, TX/RX turnaround time), a gap is inserted between contiguous frame sequences in CSMA/CA. A node thus must sense that the medium is idle for at least such a length of duration before attempting to transmit. As shown in FIG. 1, the CSMA/CA algorithm mandates that a node must verify that the channel is idle for a duration of DIFS (DCF interframe space), which comprises a SIFS (short interframe space) and 2 slots. After the DIFS, a note shall defer its transmission for a random number of slots. The random number is drawn from a uniform distribution over the interval [0,CW], unless the random number generated in the last contention has not been decreased to 0. It is possible that two nodes defer their transmissions to the same slot, leading to a collision. The two nodes are unaware of the collision until they complete their transmissions. Without a collision detection (CD) mechanism, they can only infer a collision from their unacknowledged data packets. To reduce the collision probability, the CW takes an initial value of aCWmin and then it is increased exponentially every time an unsuccessful transmission occurs, until the CW reaches the value of aCWmax. The CW cannot be reset to aCWmin unless the node successfully transmits a packet. The process makes the CW vary with the load, quickly switching to a large size when the channel contention is severe.

TABLE I

OFDM PHY characteristics

| aSlotTim | 9 µs | aSIFSTime | 16 µs |
|---|---|---|---|
| aRxTxTurnaroundTime | <2 µs | aCCATime | <4 µs |
| aAirPropagationTime | <<1 µs | aCWmin | 15 |
| aMACProcessingDelay | <2 µs | aCWmax | 1023 |

Table I summarizes the parameters defined in IEEE 802.11 standard. To ensure accurate detection of busy channel and leave enough time for radio receive-transmit switch, the slot size defined in IEEE 802.11 standard is close to the minimum feasible value. Even if there is no collision and the CW stays at the aCWmin, the average backoff time incurred by CSMA/CA is aDIFS+aCWmin/2*aSlotTime=aSIFSTime+(2+aCWmin/2)*aSlotTime=16 µs+(2+7.5)*9 µs=101.5 µs for OFDM PHY, but the data rate with OFDM PHY can reach 600 Mbps in 802.11n, leading to a transmission time of 20 µs for a 1500 byte packet. The channel access overhead becomes a major factor that causes the inefficiency of WiFi. Although the motivation for this disclosure is discussed in relation to Wi-Fi, the ideas can be generalized to other multicarrier wireless networks.

With the emerging full duplex wireless communication and NC-OFDM, it is possible to exploit the frequency diversity for collision detection (i.e., analyzing received signal in the frequency domain). OFDM divides a wide band of wireless spectrum to multiple narrow band channels known as subcarriers. Each subcarrier carries a data stream in parallel with others. With ND-OFDM, a node can map data streams only to a subset of subcarriers. Consequently, a node can easily detect a collision if it observes activities on subcarriers that are not used by itself. Based on this idea, recent collision detection proposals let a node transmit on one randomly selected subcarrier. Contending nodes learn each other's random number in the frequency domain and the node with the largest random number wins. In practice, however, only a few subcarriers are available for contention resolution. The probability that two nodes choose the same subcarrier is high. As a result, the collision cannot be detected and both nodes will start data transmission. Therefore, although channel access overhead is reduced, retransmission overhead is increased due to more collisions.

With a few number of subcarriers available for contention resolution, this disclosure introduces a binary mapping scheme to decrease the collision probability. The winner in a contention is selected through a bitwise arbitration mechanism, which forces low priority nodes to abort their transmissions so that only one node survives and proceeds to data transmission. The node that has the highest priority survives and proceeds to data transmission. The bitwise arbitration is very efficient because it ends immediately when the collision is resolved. The arbitration phase is on average shorter than the designed length.

Figure 2:
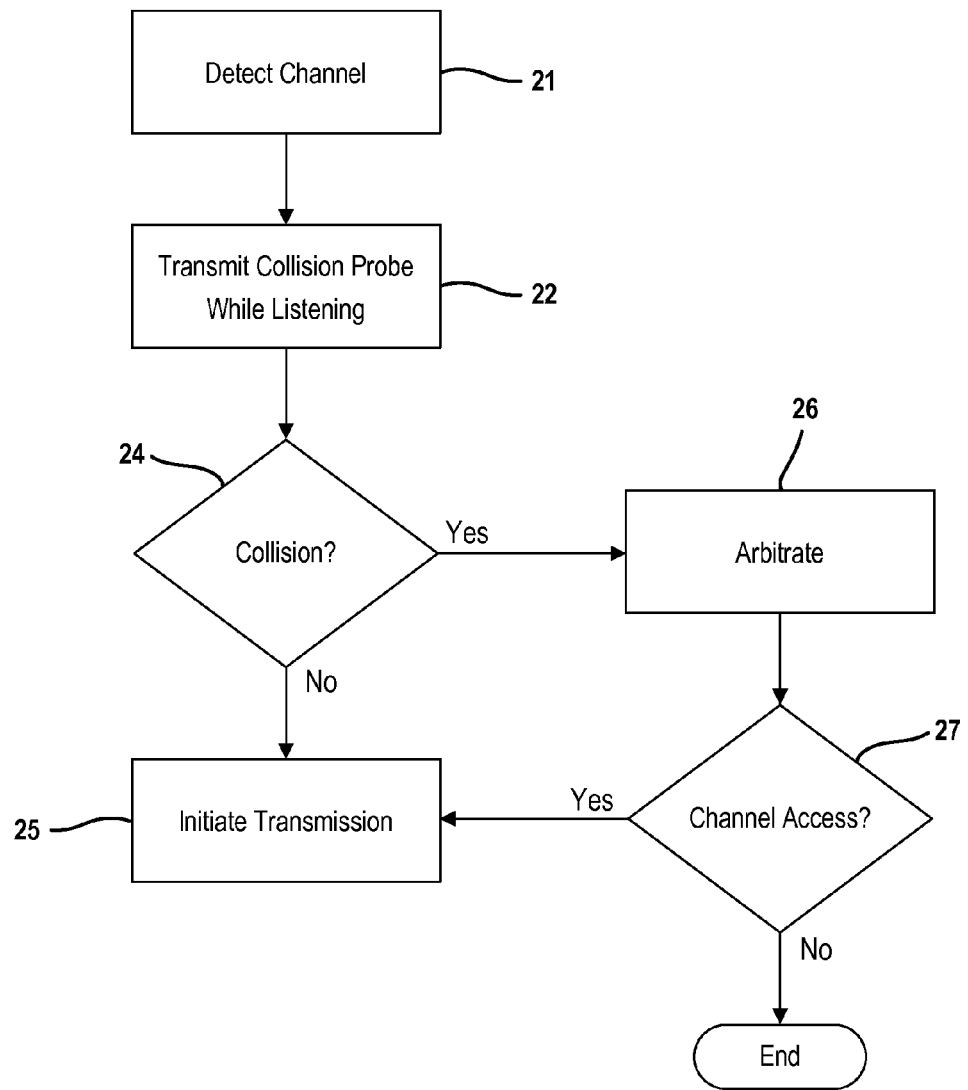
FIG. 2 is a flowchart depicting an exemplary channel access method for devices in a multicarrier wireless network.

FIG. 2 illustrates the proposed bitwise arbitration method for detecting collisions in a multicarrier wireless network. In general, the proposed arbitration method precedes each data transmission with a collision probe phase and an arbitration phase. However, the bitwise arbitration mechanism is activated only when a collision is detected in the collision probe phase, otherwise the arbitration phase is skipped and the data transmission is initiated immediately after the collision probe. This is optimized for single transmitter scenarios. In an exemplary embodiment, the data transmission uses the same PHY convergence procedure defined in 802.11 to estimate the channel impulse response and indicate the start of a data frame. While reference is made to particular Institute of Electrical and Electronics Engineers (IEEE) standards, it is readily understood that the broader aspects of the proposed arbitration method are applicable to other communication protocols and types of multicarrier wireless networks.

To make nodes be able to detect collisions, each node generates an arbitration preamble of unique frequency features. In an example embodiment, the method is to let a node draw a random number from a uniform distribution over

Figure 3:
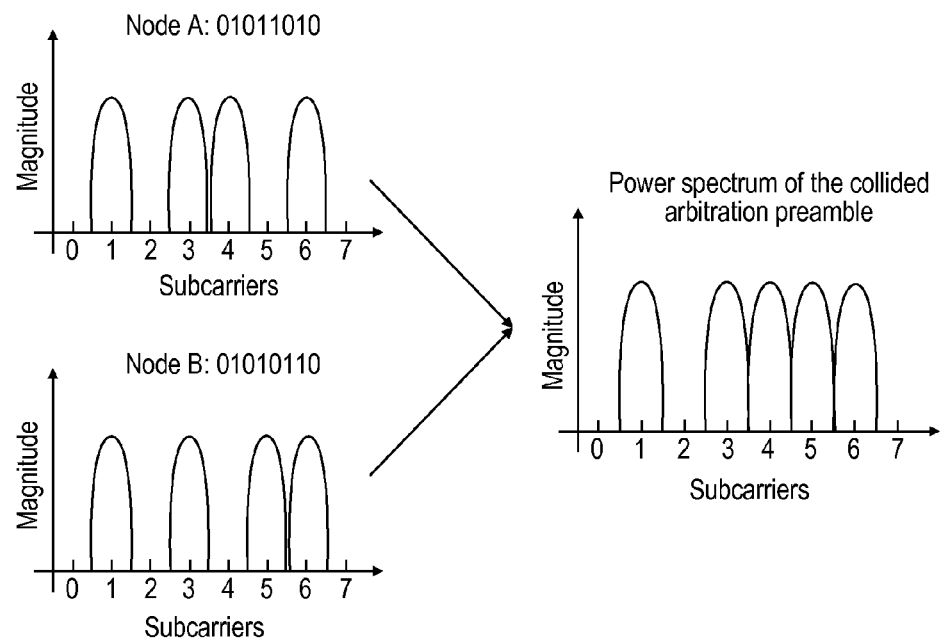
FIG. 3 is a diagram depicting the mapping of binary codewords from two different nodes to different subcarrier frequencies of a data channel.

[1,$2^k$−1] before each contention. The random number represents the node's priority in this round of contention. Here k is the number of subcarriers and the probability that two nodes choose the same number decreases exponentially with the k. Because a node can use subcarriers selectively in NC-OFDM, a k bit binary code is used to represent the random number and the binary code is mapped to subcarriers with '1' indicating active and '0' indicating inactive as shown in FIG. 3.

To implement the mapping, a node simply feeds 0 instead of modulation symbols (e.g., 1+0i, −1+0i in BPSK) to the inactive subcarriers, leading to zero power on them. An arbitration preamble is designed as one OFDM symbol, which consists of k samples in a k-point inverse fast Fourier transform (IFFT) algorithm. IFFT is employed by OFDM to efficiently modulate multiple subcarriers at the same time. In one embodiment, suppose a 64-point IFFT is used to modulate 64 parallel subcarriers. The output of the IFFT consists of 64 samples that are referred to as one OFDM symbol. The arbitration preamble overhead is low because it takes only 3.2 μs to transmit 64 samples at 20 MHz in Wi-Fi. It is understood that the number of subcarriers may vary amongst different embodiments.

With the arbitration preamble design, a collision can be detected in the frequency domain if collided transmissions use different binary codes for active/inactive subcarrier mapping. Because the probability that the two nodes choose the same binary code is low, the mapping of binary code to subcarriers greatly reduces the collision probability in data transmission. To support collision detection, it is assumed that at least two antennas are equipped on a node, one for transmitting and one for listening. As MIMO is a trend in wireless communication, multiple antennas are expected to be available on most devices in the near future. Although collision detection requires an antenna for listening, all antennas are available for data transmission once arbitration ends. Therefore, the proposed arbitration method is compatible with MIMO.

With continued reference to FIG. 2, the proposed arbitration method looks for an idle condition on a data channel of a shared transmission medium as indicated at 21, where the data channel is divided into a plurality of subcarrier frequencies. The proposed arbitration method allows a node to start transmission immediately when the channel is sensed to be idle. To check whether this bold attempt will cause a collision, a collision probe is generated from a binary codeword comprised on k bits in the manner described above. The collision probe function is performed at 22 by broadcasting the aforementioned arbitration preamble once as shown in FIG. 4.

While a node is transmitting the arbitration preamble, it concurrently listens on the channel. A collision on the data channel is detected at 24 based on the presence of a signal on a subcarrier frequency of the received signal whose corresponding bit value of the node in the collision probe is zero. More specifically, each subcarrier frequency of the received signal is demodulated into a bit value of a binary codeword and the bit values from the received signal are compared to the corresponding bit values of the collision probe. In an exemplary embodiment, the node performs a fast Fourier transform on the received signal. The FFT result presents magnitude on each subcarrier. The node checks the magnitudes on inactive subcarriers defined by its binary code. If no other node is transmitting, the node will not observe high magnitudes on subcarriers that are deactivated by itself. The node thus assumes that there is no collision and proceeds to initiate data transmission as indicated at 25. When there is only one node that has data to send, the data transmission is deferred for only one OFDM symbol duration. For a sampling rate of 20 MHz in 802.11n, the collision probe takes 3.2 μs. The channel access overhead is reduced from the average 101.5 μs to a fixed 3.2 μs for single transmitter scenarios.

When multiple nodes have data to transmit, it is possible that two nodes detect clear channel and transmit collision probes at a similar time. In this case, the nodes will detect a collision at 24 and proceed with an arbitration phase as indicated at 26.

Figure 4:
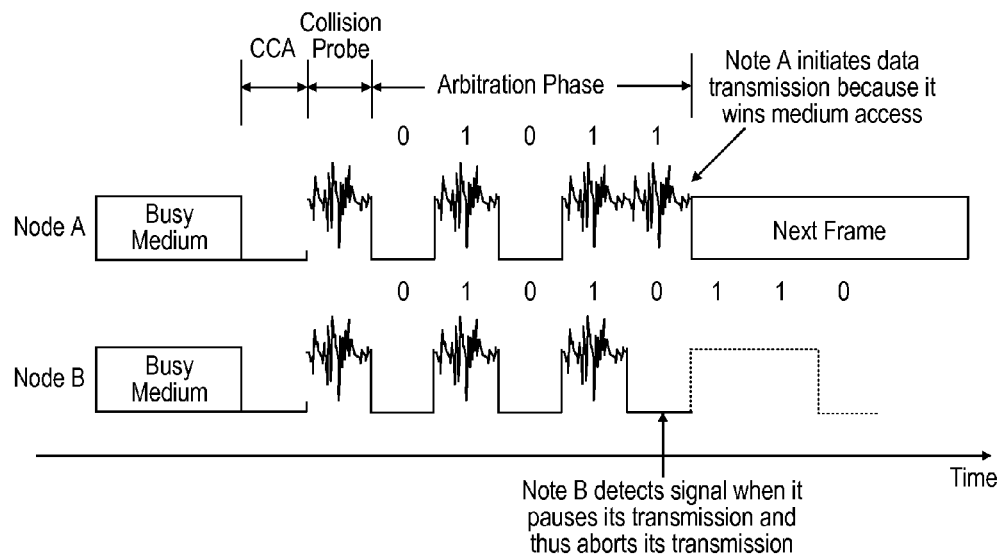
FIG. 4 is a diagram illustrating a bitwise arbitration technique.

FIG. 4 further illustrates the bitwise arbitration process. Each node checks its selected binary code, where bit values are selected from the code in a predefined order. In an exemplary embodiment, bits are selected from the most significant bit to the least significant bit although other selection orders are contemplated by this disclosure. Starting from the most significant bit, if the bit is '1', the node transmits its arbitration preamble once; if the bit is '0', the node pauses its transmission for a period of time (e.g., one OFDM symbol long). If the node detects collision when it is transmitting, it continues to check the next bit. If the channel is clear when it pauses its transmission, it continues to check the next bit because the collision has not been resolved. If it detects signal when it pauses its transmission, it loses the channel access contention and aborts its transmission. As contending nodes gradually abort their transmissions, only one node will survive and it proceeds to data transmission once the frequency spectrum matches its binary code as indicated at 27. Because the bitwise arbitration phase may end earlier without traversing all bits, The arbitration method provides low collision probability $$\left(\text{i.e., } \frac{1}{(2^k-1)^2}\right)$$

with low overhead (at most (k+1)*3.2 μs at 20 MHz). Note that k is not necessarily to be the total number of subcarriers because it determines the maximum length of the arbitration phase. In implementation, only a small number of subcarriers are selected to perform binary code mapping. The maximum arbitration overhead is bounded by the k. It is noted that the binary code selected by a node has dual functions: it is not only used for constructing the arbitration preamble in the frequency domain, but also used during arbitration to determine whether they can continue transmission in the time domain.

Figure 5:
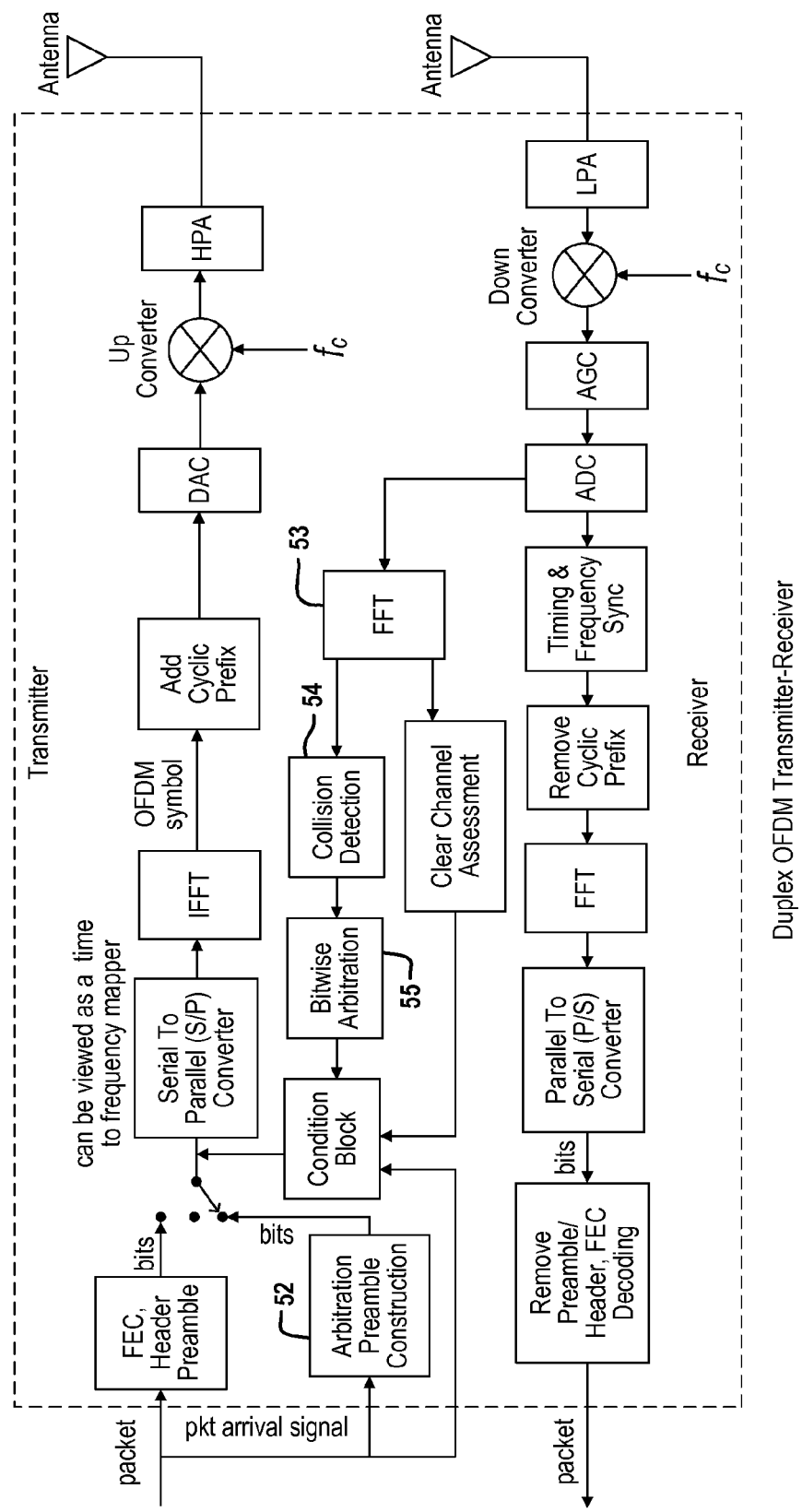
FIG. 5 is a block diagram depicting how to integrate the detection and arbitration techniques into an exemplary communication device.

FIG. 5 illustrates how the channel access technique described above can be integrated into the architecture of a typical wireless communication device. Before initiating data transmission, the device enters a collision detection phase as show in FIG. 4. During the collision detection phase, a collision probe is constructed by the preamble construction module indicated at 52. In one embodiment, this function is implemented by computer-readable instructions executed by a computer processor residing in the device. The term module may also refer to, be part of, or include an electronic circuit, an Application Specific Integrated Circuit (ASIC), a combinational logic circuit, and/or other suitable components that provide the described functionality. The collision probe can then be transmitted in a manner readily understood in the art.

On the receive side, an incoming signal is demodulated, for example using a fast Fourier transform at 53. During the collision detection phase, the incoming data signal is compared to the bit values of the collision probe by the collision detection module 54. In this way, a collision can be detected by the device prior to initiating data transmission. During the arbitration phase, bitwise arbitration is carried out by the bitwise arbitration module 55. In either case, these functions can be implemented by computer-readable instructions executed by a computer processor residing in the device. The term module may also refer to, be part of, or include an electronic circuit, an Application Specific Integrated Circuit (ASIC), a combinational logic circuit, and/or other suitable components that provide the described functionality.

Figure 6A:
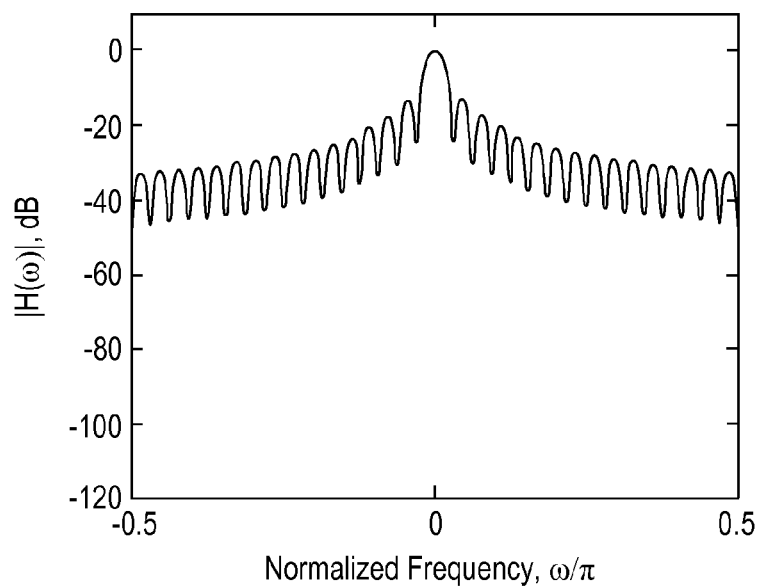
FIGS. 6A-6H are diagrams illustrating fast Fourier transform results of received signals when two nodes are transmitting on a shared channel.
Figure 6B:
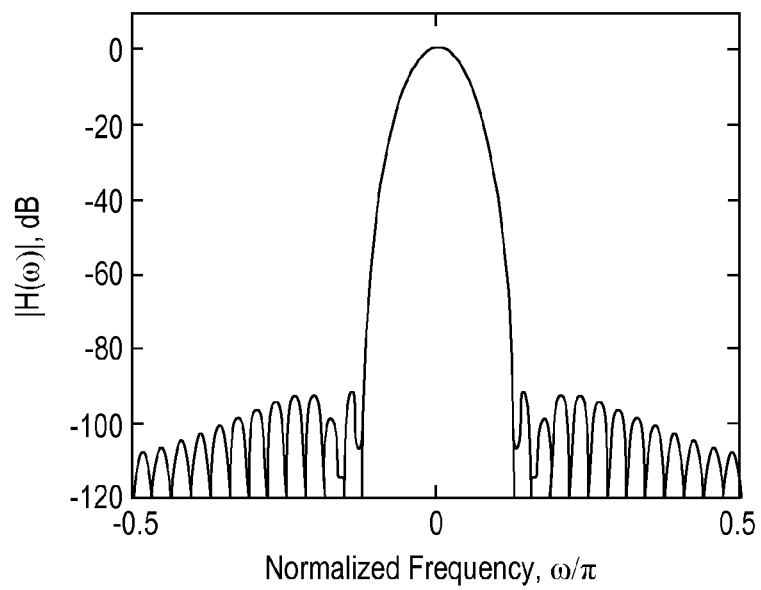
Figure 6C:
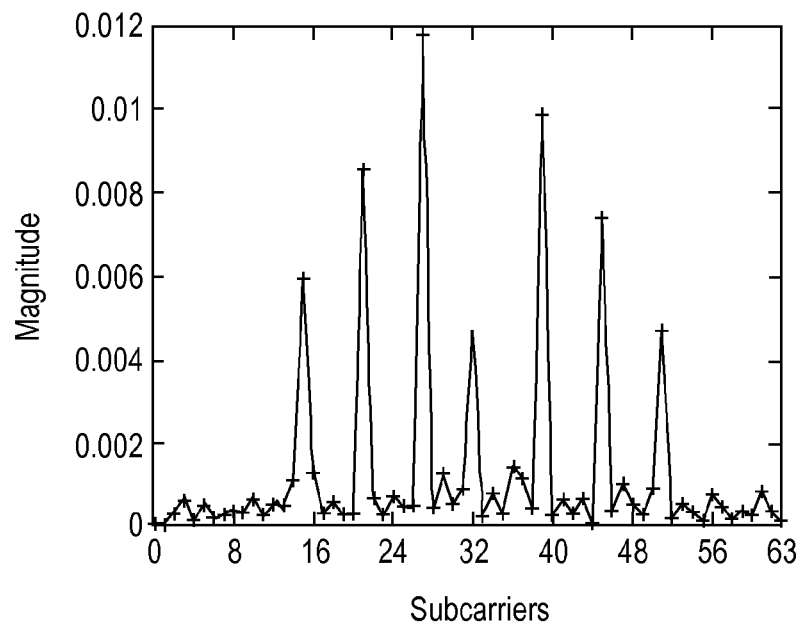

Next, the feasibility and practical issues of various components in an implementation of the proposed arbitration method are discussed. The collision detection relies on detecting frequency features of arbitration preambles. Noise and interference may mask these features, leading to incorrect detection. Traditional energy-based clear channel assessment (CCA) calculates channel energy with a sliding window, in which noise energy is accumulated with signal. In the proposed arbitration method, spectrum analysis is performed on received signal with FFT. The noise energy is distributed across all subcarriers. The variance of noise energy on each subcarrier is much smaller than the overall variance observed in the time domain. As a result, although in the time domain it may be hard to distinguish signal from noise in a short time, in the frequency domain the energy difference between signal and noise is large enough to differentiate them as shown in FIG. 6C. The arbitration preamble detection also benefits from the design that all power of a transmitter is concentrated on several selected subcarriers. This increases the detection probability.

For interference, if there is a strong interference, nodes will not start transmission as the channel is busy. If the strong interference occurs in the arbitration phase, it is reasonable to abort a node's transmission because the following data transmission cannot succeed under the strong interference. A problem is the interference from neighboring nodes who have different destinations. If the interference is weak, it can be regarded as noise since the two nodes are far away. If it is strong, nodes have to follow the CSMA rule, waiting the channel to be clear. Such a behavior complies with the general principle of wireless system designs: a node is allowed to access the channel only when the node is the winner in all contention domains.

For an infinitely long sine wave of a single frequency, the frequency spectrum is an infinitesimally narrow peak (i.e., a delta function). Because we cannot bring an infinite long signal into a digital computer, we usually sample the input signal at a sample rate of $f_s$ and divide the discrete samples into segments. Suppose a N-point FFT algorithm is used. A short segment of N samples is analyzed at one time. The FFT algorithm outputs magnitudes and phases at N analytical frequencies $$f(m) = \frac{mf_s}{N},$$

where m=0, 1, 2, . . . , N−1.

Note that the original signal is implicitly truncated by a rectangular window because only N samples are extracted from the original signal while others are set to zero. An important Fourier transform property is that multiplication in one domain corresponds to convolution in the other domain. Therefore, the corresponding frequency responses of the signal and the window function are convolved in the frequency domain. Since the original spectrum of the sine wave is a delta function, the spectrum of the windowed signal appears as the spectrum of the window function shifted to the location of the peak. As shown in FIG. 6A, the frequency response of a rectangular window function has numerous side lobes. The spectrum of the windowed sine wave is thus no longer a delta function and this is unavoidable in digital process because we use only a portion of the original time domain signal.

Figure 6D:
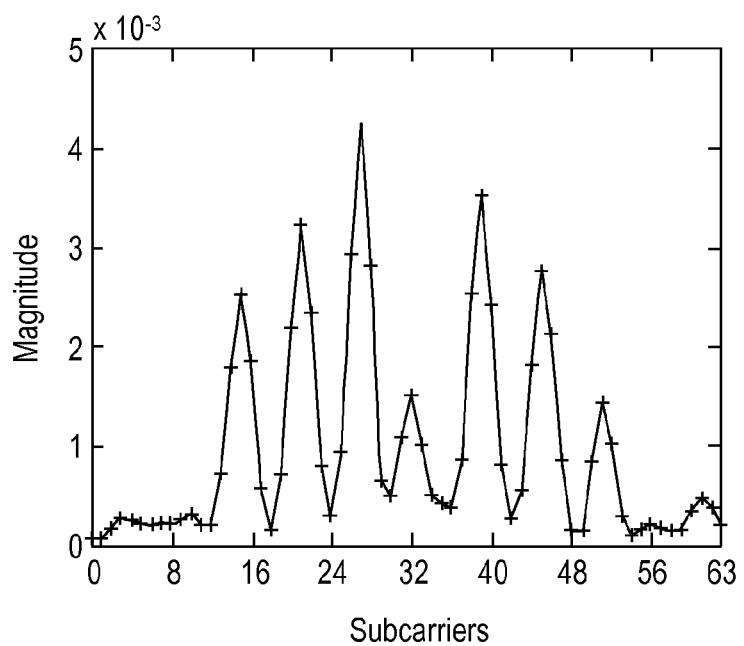
Figure 6E:
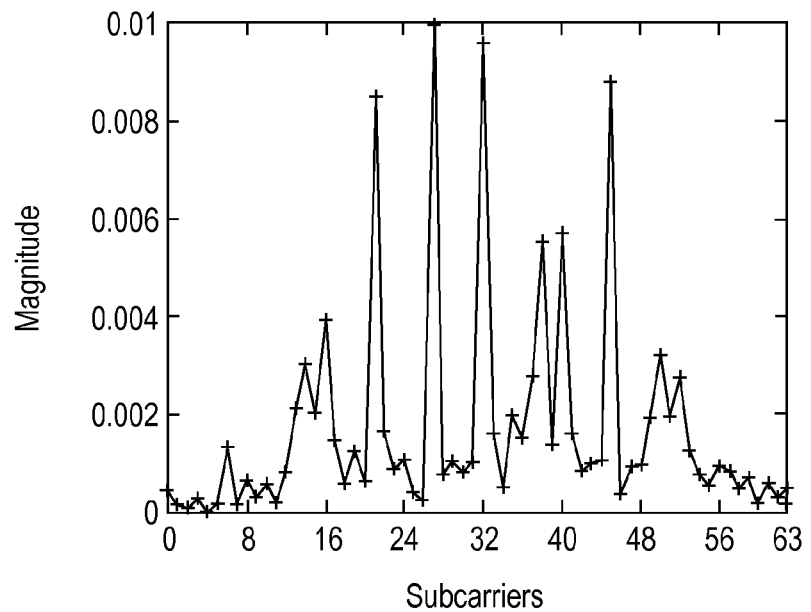

The frequency response of a continuous signal is a continuous curve in the frequency domain. When the continuous signal is sampled in the time domain, the effect is same as sampling the corresponding continuous curve in the frequency domain. Because we usually use N samples in a N-point FFT algorithm, the small number of samples on the spectrum's continuous curve results in irregular tails depending on where the samples occur. If the input segment contains energy precisely at integral multiples of the fundamental frequency, $f_s/N$, the samples occur exactly at the valleys in the spectrum and there is no tail as shown in FIG. 6C. However, if the input segment has a signal component at an intermediate frequency between two analytical frequencies of $mf_s/N$, the samples occur somewhere along the peaks and valleys, resulting in power leakage to other frequencies. The obtained frequency spectrum may mislead a node to believe that there are signals on some inactive subcarriers as shown in FIG. 6E. The collision detection is thus not reliable, making nodes abort transmissions for nonexistent contentions.

Figure 6F:
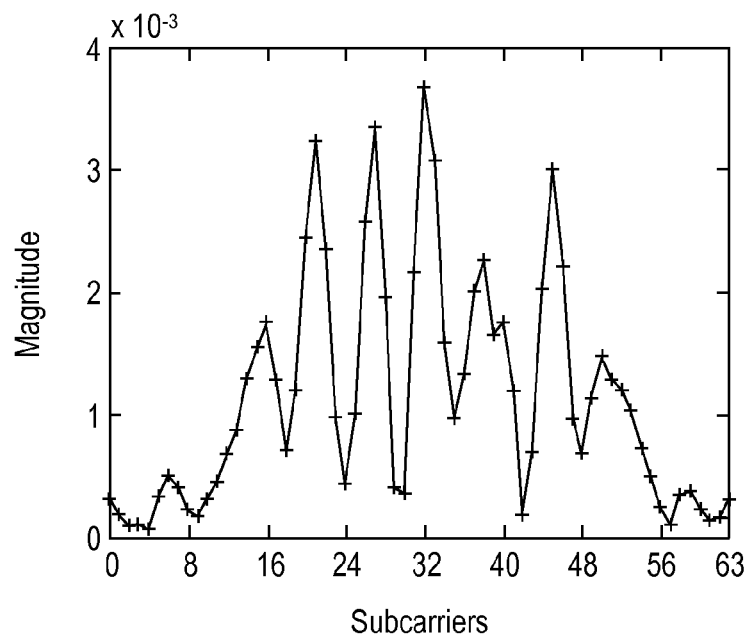
Figure 6G:
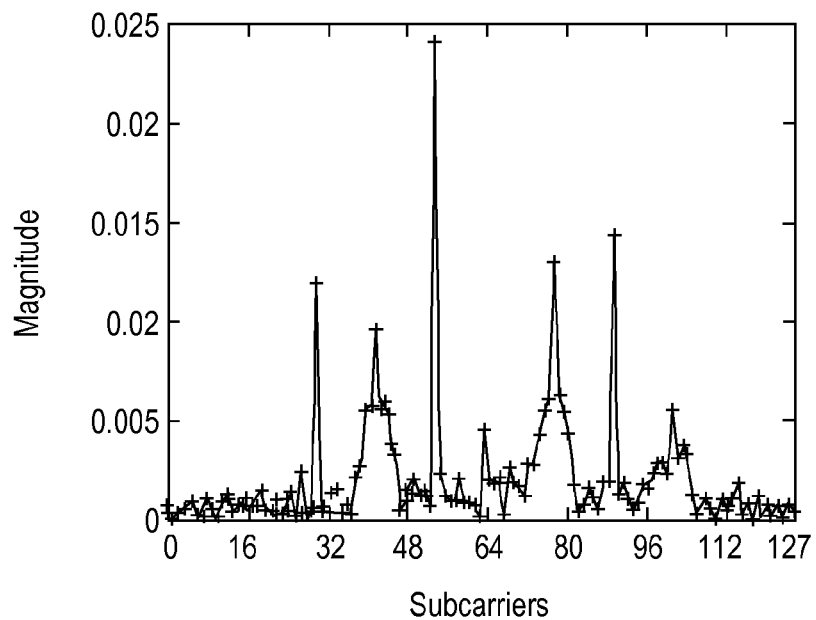
Figure 6H:
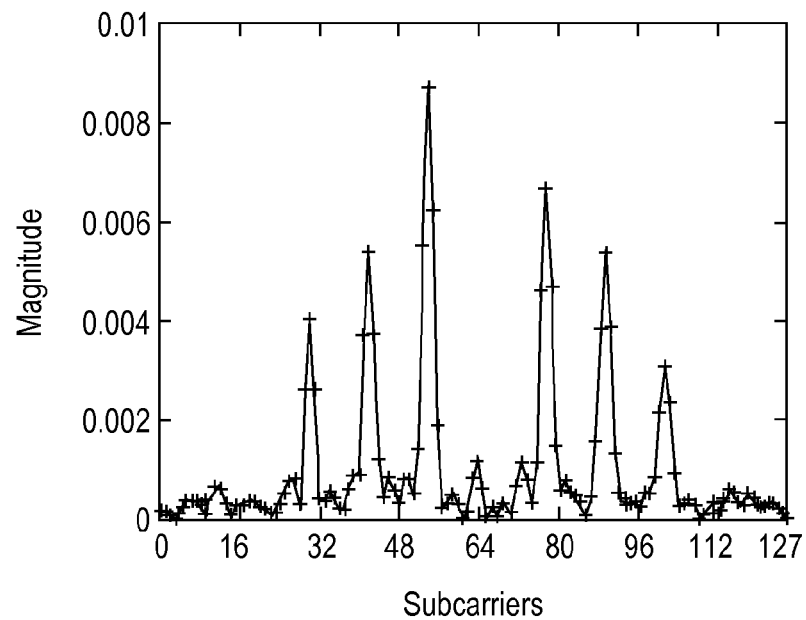

To make collision detection reliable, a window function is applied that shapes the samples more gently instead of using a rectangular window that suddenly set all samples outside of the window to a value of zero. The use of a proper window function is to reduce the order of discontinuity at the boundary, which is the cause of side lobes. As shown in FIG. 6B, a Blackman-Harris window function yields much lower magnitude tails compared with the rectangular window. FIG. 6F shows that for the same time domain signal segment, the shape of the FFT result is much better. If we continue to take more samples, the shape is clearer as shown in FIG. 6H, but without a proper window function the improvement is limited as illustrated in FIG. 6G. Accumulated energy should make active subcarriers and inactive subcarriers more distinguishable. However, if the power leakage is not suppressed by a proper window function, inactive subcarriers may still accumulate enough energy to cause incorrect detection. Therefore, it is impractical to use all subcarriers for contention resolution.

Although windows like the Blackman-Harris window suppress the tail, they have a wider main lobe compared with the rectangular window, leading to wider peaks. The spectrum resolution is reduced. Because two points at each side of a peak have observable magnitudes as shown in FIG. 6D, one subcarrier is used every six subcarriers. This large separation ensures that an active subcarrier will not be detected as active due to power leakage. There are many other window functions available. In general a window function that produces lower side lobes has a wider main lobe. There is a trade-off between main lobe width and side lobe levels. The Blackman-Harris window is chosen because it is able to suppress the side lobes by more than 92 dB with a main lobe width that is acceptable in our design. The Blackman-Harris window is also identified as a top performer in many applications.

For a 64-point FFT, 64 subcarriers are available. On our test equipments Universal Software Radio Peripheral (USRP), there is a pretty gradual roll-off that causes strong curvature at two edges and there is a DC offset in the middle. Consequently, we avoid using 5 subcarriers at each edge and 6 subcarriers in the middle, leading to 48/6=8 subcarriers for binary code mapping (4 at each side of the DC offset). With only 8 subcarriers available for contention resolution, current collision detection designs will introduce high collision probability because if two nodes choose the same subcarrier, they do not know that they will have a collision in data transmission. It is possible to reduce the collision probability by increasing the number of subcarriers, but increasing the number of subcarriers means a N-point FFT consumes more samples at once. It takes more time to collect samples and the overhead is increased. Further, the reduced subcarrier spacing makes a protocol more sensitive to frequency offset. With binary mapping, even if only eight subcarriers are available, they can represent $2^8-1=255$ unique binary codes (0 is excluded). The collision probability is same as setting the backoff window size to 255 in CSMA/CA, where a device will on average wait about $254/2=127$ slots before transmission. It corresponds to an average backoff of 1.143 ms. On the contrary, the proposed arbitration method takes only one FFT frame for collision probe and at most 8 FFT frames for bitwise arbitration. Suppose a 64-point FFT is used in a 20 MHz channel. The maximum overhead is $9*3.2$ μs$=28.8$ μs, which is a significant reduction on channel access overhead.

Figure 7:
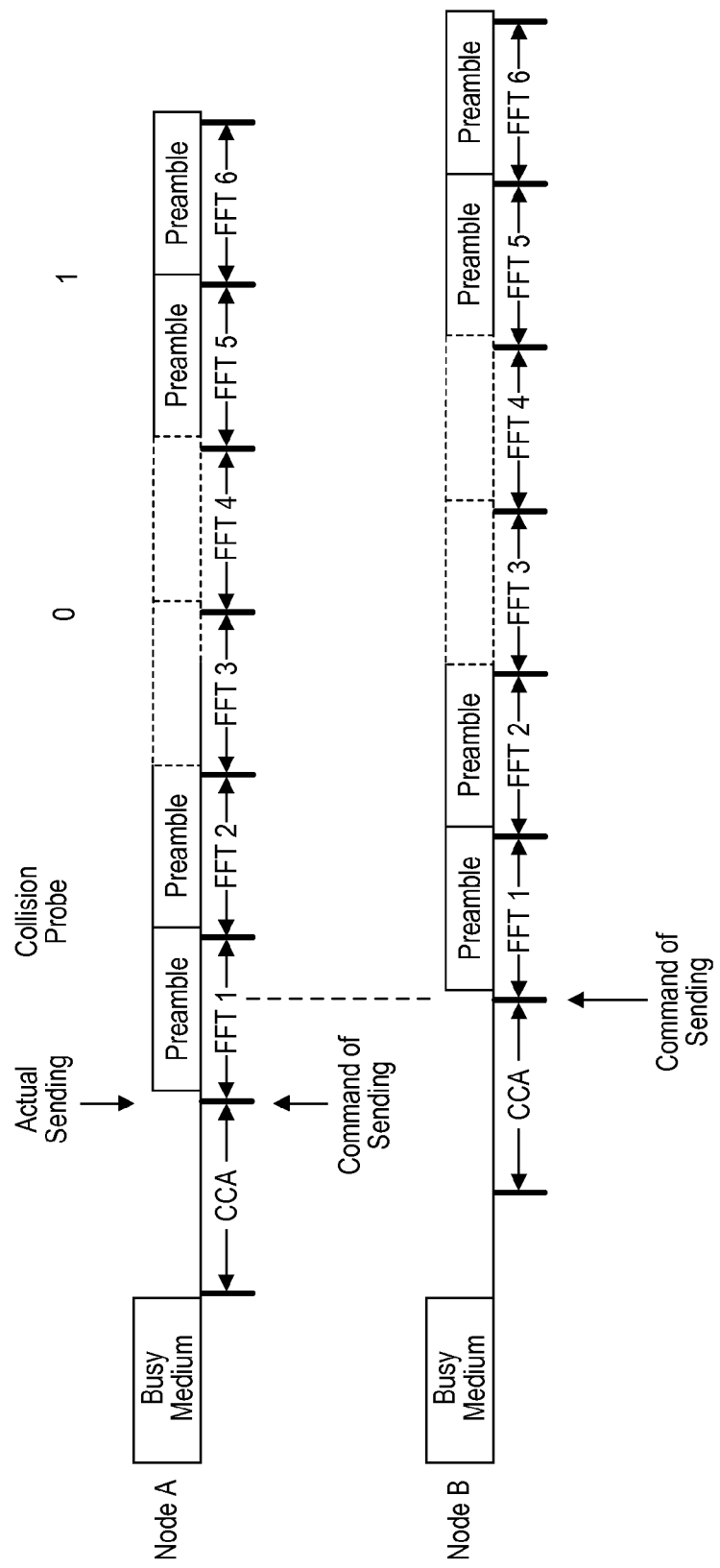
FIG. 7 is a diagram illustrating the timing for transmitting a preamble.
Figure 8A:
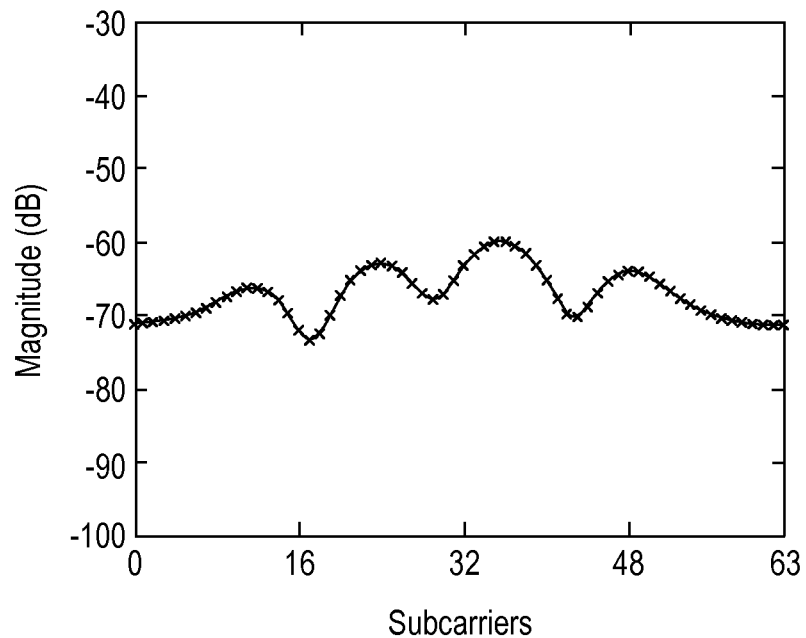
FIGS. 8A-8D are diagrams illustrating different amounts of an arbitration preamble included in a fast Fourier transform.
Figure 8B:
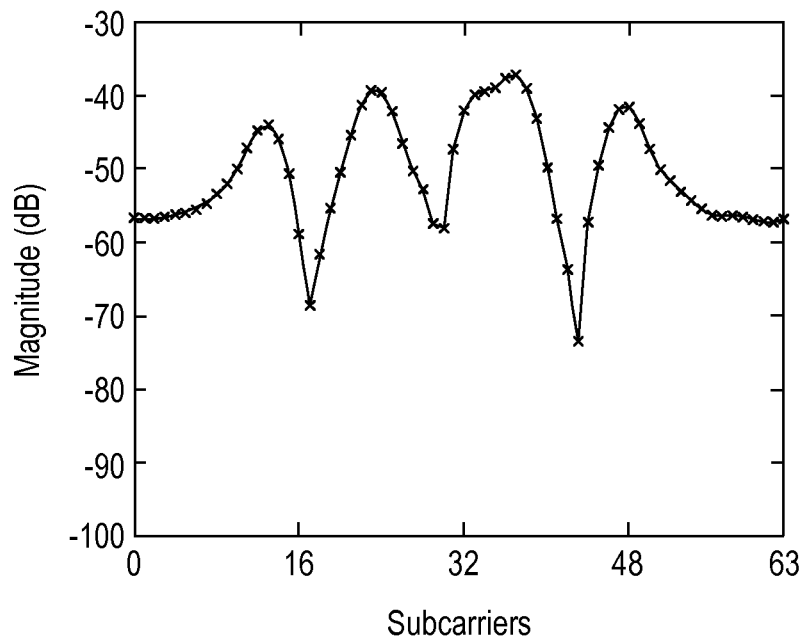
Figure 8C:
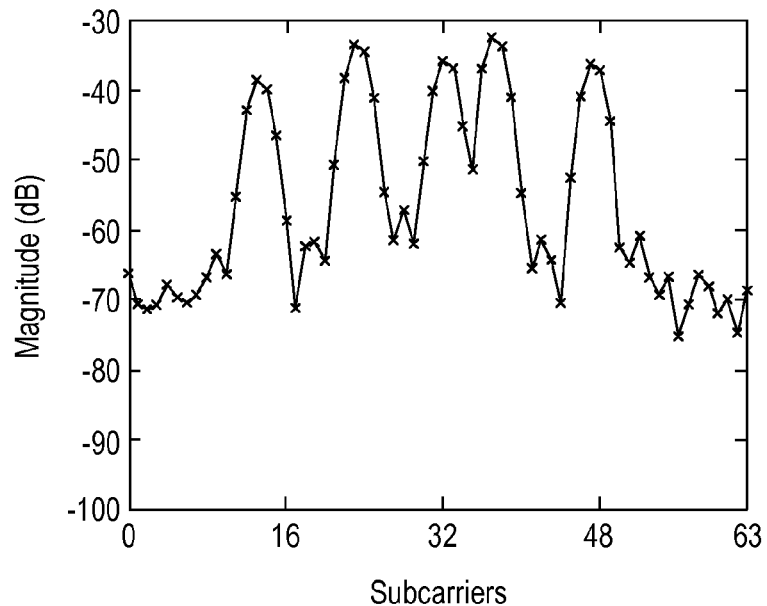
Figure 8D:
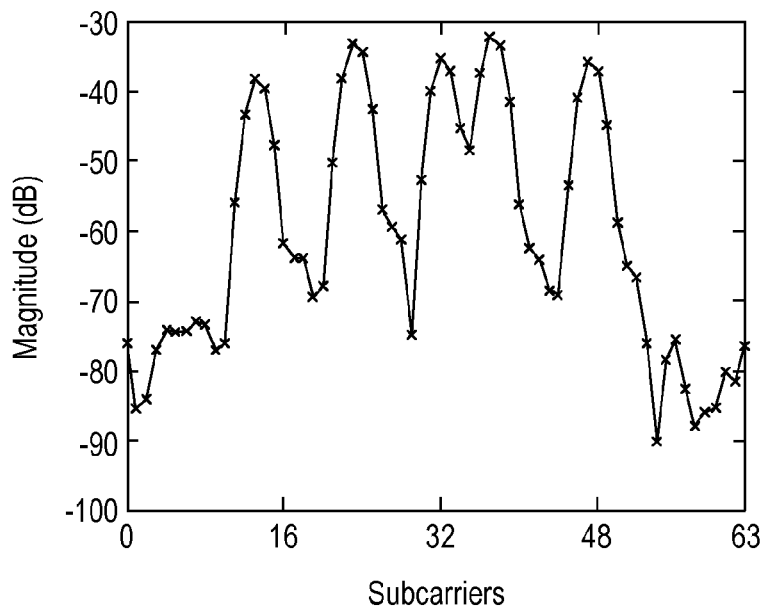

When the CCA algorithm indicates that the channel is clear, a node randomly selects a number and instructs the transmitter to send the corresponding arbitration preamble as shown in FIG. 7. To meet the stringent time requirement of MAC, the proposed arbitration method can be implemented on FPGA of USRP E110. However, a delay is observed between the command of sending and the actual sending. The first FFT window after the command of sending may not include all arbitration preamble samples (a complete OFDM symbol). The FFT result is thus distorted a little bit and sometimes cannot accurately reflect active subcarriers. This may make a node believe that there is a collision and abort its transmission. To solve the problem, the arbitration preamble is repeated once so that the second FFT window includes a complete arbitration preamble. This works as a cyclic prefix in OFDM and addresses the propagation delay issue too. The results of odd FFT frames are discarded and the results of even FFT frames are used to determine whether a collision still exists. A disadvantage is that the incurred overhead is doubled. A node will defer data transmission for at least 2 FFT frames even when there is no collision.

Contending nodes are implicitly synchronized by busy medium. However, if a node gets data to send after the medium becomes idle, its contention may not be synchronized with other contending nodes. As shown in FIG. 7, its CCA window contains a portion of preambles sent by other contending nodes. FIG. 8 shows the difference when different amounts of an arbitration preamble are included in the CCA window. Even with only half of an arbitration preamble, the FFT result can clearly show the difference between active and inactive subcarriers because all power of a transmitter is concentrated on several active subcarriers selected by the transmitter. As discussed above, only several specific subcarriers are used for channel access contention. Therefore, the CCA indicates a busy channel if magnitudes on some of these particular subcarriers are above a threshold. As a result, the CCA allows two nodes to initiate transmissions only at slightly different times. The repeating of an arbitration preamble ensures that an FFT window contains a major portion of an arbitration preamble and the bitwise arbitration works properly in asynchronous mode.

For example, node B in FIG. 7 may initiate the collision probe if its CCA window includes less than half of an arbitration preamble sent by node A. Correspondingly, the second FFT of node B includes more than half of an arbitration preamble sent by node A. Node B will observe a collision and enter in the arbitration phase. The fourth FFT of node B includes a portion of an arbitration preamble sent by node A. If the portion is small, the sixth FFT of node B will include a portion that is large enough to indicate collision. If the portion is large, node B loses channel access contention right away, ending arbitration earlier.

To better improve the efficiency when contention is heavy, contending nodes intentionally desynchronize. In large deployment simulations, the arbitration phase can be shortened by reducing the number of nodes that participate in bitwise arbitration. Bitwise arbitration is not relied upon solely to determine the winner in a contention. A short random backoff is introduced. Because half of an arbitration preamble is able to indicate busy, we defer nodes' transmissions by a random number of slots with a slot duration that is half of an arbitration preamble (e.g., 3.2 μs/2=1.6 μs at 20 MHz). The random backoff is much shorter than what is defined in 802.11. With a short random backoff, we can reduce the number of contending nodes that enter in the collision probe phase, which in turn helps to shorten the arbitration phase. For example, suppose we need to traverse 4 bits to resolve collisions between 5 nodes. With random backoff, only 2 nodes may enter in the collision probe phase immediately while other 3 nodes back off due to detected busy medium. It is possible that the collision between the two nodes is able to be resolved in the first bit in the arbitration phase. The arbitration phase is thus shortened without introducing any overhead. Note that the two nodes enter in the collision probe phase without any backoff. The random backoff mechanism thus does not introduce any overhead. It just helps to reduce the number of nodes that participate in the collision probe and bitwise arbitration.

However, when the contention is light, the random backoff is an overhead because the probability that some nodes will start collision probe without any backoff is low. If the saved time in arbitration phase is less than the introduced backoff, the random backoff mechanism should be disabled. Therefore, we let a node monitor the length of the arbitration phase. If it on average needs to traverse more than half of total bits to determine the winner, it enables the random backoff; otherwise it disables the random backoff. This helps to maintain the efficiency of the bitwise arbitration.

Due to frequency-selective fading, the power on some subcarriers may be weak. If a node chooses a binary code with only one bit set to '1', its arbitration preamble may not be detected by another contending node due to imperfect self-interference cancellation. Thus the 8 bit binary code is split into two 4 bit binary codes. Each 4 bit binary code represents the subcarrier occupation on each side of the DC offset. A node now occupies at least one subcarrier on two different parts of the frequency spectrum. The collision detection is more reliable because usually at least one of them will be detected by other contending nodes. The collision probability, however, is slightly increased. 1111 1111 can be reserved for beacons or urgent control packets sent by access points (APs). The code 0000 0000 is excluded. The number of unique binary codes is reduced from $2^8-2=254$ to $(2^4-2)^2=196$. If more subcarriers are available, the collision probability will be reduced exponentially.

Note that when more than one node initiates arbitration preamble transmission at a similar time, the signal-to-interference-plus-noise ratio (SINR) increases, but we only need to look at the SNR. This is because two nodes occupy different subcarriers, the arbitration preamble from each other is detectable as long as the SNR is above the detection threshold. Two nodes may occupy some same subcarriers, but the interference actually helps the third node detect collision for the high aggregated power on the shared subcarriers.

In the 802.11 standard, the OFDM PLCP (physical layer convergence procedure) preamble is BPSK-OFDM modulated with coding rate ½. The 802.11 standard thus mandates that the CCA mechanism should indicate busy for the start of a valid OFM transmission at a power level equal to or greater than the minimum modulation and coding rare sensitivity (e.g., −82 dBm for 20 MHz channel spacing). If the preamble portion was missed, the CCA mechanism should signal busy for any signal 20 dB above the minimum modulation and coding rate sensitivity (e.g., −62 dBm for 20 MHz channel spacing). The high threshold ensures that a node does not back off for noise, but may make two nodes invisible to each other. Because an arbitration preamble is designed to have certain unique frequency features, it is detectable at a low signal-to-noise ratio (SNR) as shown in performance evaluation, making the detection range larger than the carrier sensing range. Therefore, most hidden terminals can detect each other's arbitration preamble.

Figure 9:
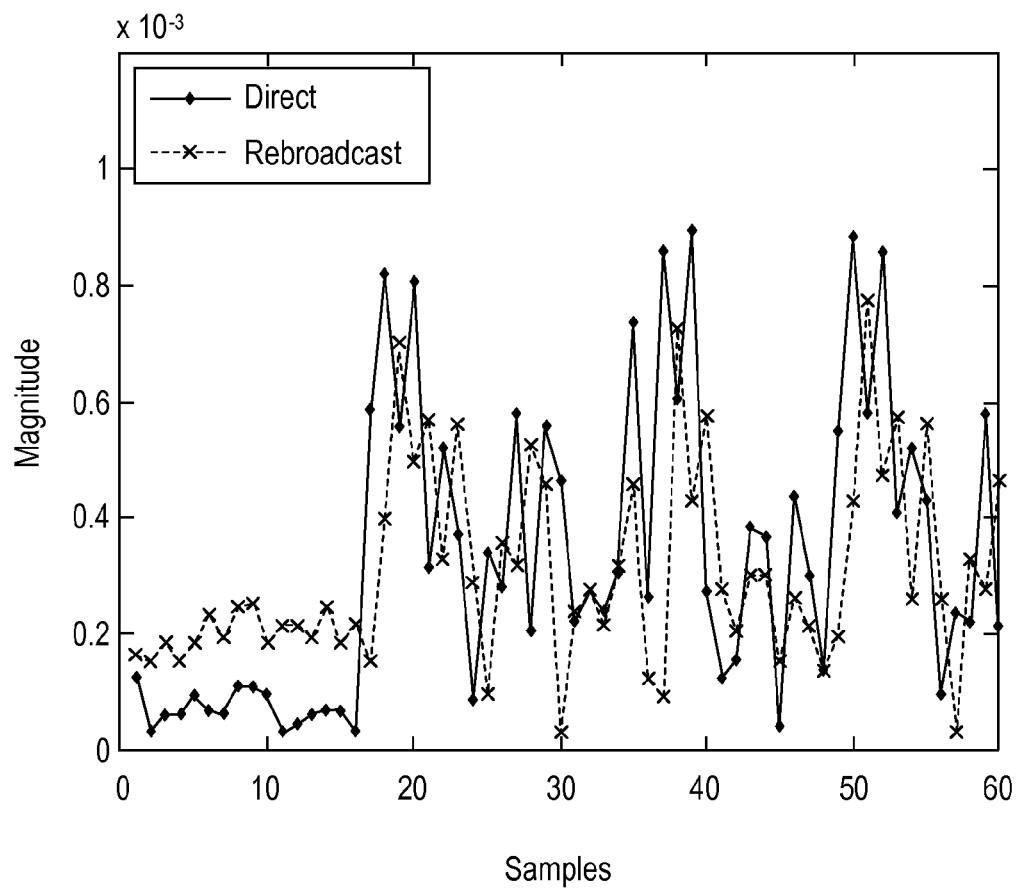
FIG. 9 is a diagram show a comparison of a signal from the original transmitter with the signal from a relaying node in the time domain.

In addition, letting the AP rebroadcast whatever it received in the collision probe and bitwise arbitration phase can further address the hidden terminal issue. To check the delay of rebroadcasting, we conduct the following experiment with three USRP E110. The rebroadcast function is implemented at the very front of the receiving chain. Node A is connected with node B and node C through cables. Node B rebroadcasts whatever it received from node A. Node C compares signals that are directly received from A with signals that are received from node B. Measurements show that the rebroadcasted signal is only one sample delayed as shown in FIG. 9. With the rebroadcast at the receiver, collision detection is guaranteed for hidden terminals in the collision probe phase and the arbitration phase. However, once the data transmission begins, all antennas on the receiver are used for receiving. Hidden terminals may think that the channel is idle without the rebroadcast at the receiver. To avoid collisions, the proposed arbitration method lets a node set the channel state to busy for a data transmission period when it detects an arbitration preamble. Since usually one node will survive the arbitration, the channel utilization is not reduced. Collisions caused by hidden terminals are avoided because hidden terminals defer their transmissions for a complete data transmission period once they lose a contention.

The bitwise arbitration allows us to assign different priorities to messages. For example, we can reserve the most significant bit for urgent messages. If a node needs to send an urgent message, it selects a binary code that sets the most significant bit to 1 (1xxx xxxx). For common messages, a node selects binary codes from the remaining pool (0xxx xxxx). When two nodes attempt to send at the same time, they will detect a collision and enter in the arbitration phase. The node with a common message will pause its transmission because the most significant bit is 0. On the contrary, the node with an urgent message will win the channel access contention immediately. This allows high priority messages to get through unimpeded, making the proposed arbitration method suitable for real time prioritized communication. It is envisioned that several levels of priorities can be set with the first m most significant bits.

1111 1111 can be reserved for beacons and implement a time slotted network without time slot assignment. In Wi-Fi, time slots are not assigned to nodes because their traffic is dynamic. If time division multiple access (TDMA) is used, time slots are wasted if the owner has no data to send. In the proposed arbitration method, all time slots are open to any node. A node can stay in the low power sleep mode if it has no data to send. It may periodically wake up in some time slots to check whether it has data to receive. When it has data to send, it initiates the collision probe at the beginning of a slot. If there is no collision, it transmits the data. If there exists a collision, it enters in the arbitration phase to resolve the collision. No slot is reserved for any node and there is no underutilization issue.

Some delay measurements show that the delay between GNU Radio and FPGA is about hundreds of microseconds on USRP platforms. If the proposed arbitration method is implemented in GNU Radio, the system delay dominates the total delay before data transmission. To meet the stringent time requirement of MAC, the collision probe and the bitwise arbitration can be implemented on FPGA while packet encoding/decoding are implemented in GNU Radio because they are more complex than spectrum analysis. When a packet is ready to send, it is buffered on FPGA and triggers the collision probe. If there is no collision, the packet is sent. If there is a collision, the bitwise arbitration is activated. Once the collision is resolved, the buffered packet is sent. Because we do not have much space for buffer on our testbeds, we set packet size to 100 bytes.

In the example test scenario, two USRP E110 equipped with WBX transceivers are used to check the feasibility of collision detection. The WBX transceiver has local oscillators (Los) that work independently for transmitting and receiving chains. In the receiving chain, a 64-point FFT algorithm is used to perform spectrum analysis. Before the FFT, a Blackman-Harris window function is applied on received signal. The outputs of the FFT algorithm are used for active subcarrier detection and collision detection. The results of collision detection are fed to the bitwise arbitration block. The transmitting and receiving antennas are separated by about 2 feet to reduce self-interference. Many optimizations are available for reducing the distance, but it is beyond the scope of this disclosure. With better self-interference cancellation techniques, the performance of collision detection is expected to be improved.

When there is no transmission, the frequency spectrum only indicates a peak in the middle (DC offset). Magnitudes on all other subcarriers are low. If we use them to derive a noise threshold, some subcarriers may be regarded as active when there are transmissions. This is because when there are transmissions, power leakage will increase the magnitudes on subcarriers that are next to an occupied subcarrier. The aggregated effect depends on how subcarriers are used by each contending node. Therefore, the noise threshold cannot be obtained by sampling the channel when there is no transmission.

To identify active subcarriers, we search for the highest magnitude in each FFT frame. If it is located at the DC offset, the channel is regarded as idle. If it is located at a subcarrier other than the DC offset, we use it as a reference. A subcarrier is regarded as active if the magnitude on the subcarrier reaches a certain percent of the highest value.

A node should be able to start data transmission if there is no other transmission. Therefore, one node is permitted to work in the full duplex mode in the first experiment. The result is based on 10,000 FFT frames. When we take 60% of the highest magnitude in a FFT frame as the noise threshold, we can avoid detecting an unoccupied subcarrier as active. If we use a lower noise threshold, some unoccupied subcarriers may be occasionally detected as active, then a node cannot start data transmission immediately because it believes that there is a collision. If the noise threshold is too high, the detected active subcarriers do not match the binary code selected by the node. It is also counted as an incorrect detection here.

Where there are other transmissions, it is easy to identify a collision if they are strong. However, depending on the adopted self-interference cancellation technique, transmissions from another node may be too weak to be detected. The efficacy of the collision detection is examined at various SNR values by conducting the following experiments. Two nodes are separated by various distances. Because the noise floor levels at a node increase when the node is simultaneously transmitting and the increment varies depending on the adopted self-interference cancellation technique, we compute the SNR at a node by setting the node to receive only. Once the SNR is measured, we set the node to full-duplex and check whether it can detect collision. The collision detection probability is 100% if the SNR is above 9 dB. Note that there is no need to decode anything, we do not require a signal to be located exactly at a subcarrier, and an arbitration preamble occupies at least two subcarriers. The collision detection is thus reliable as long as the transmission from another node is not too weak. In 802.11 standard, the defined minimum modulation and coding rate sensitivity for OFDM PHY at 20 MHz is −82 dBm, which corresponds to an SNR of 13 dB assuming a typical noise floor at −95 dBm. The arbitration preamble can be reliably detected within the carrier sensing range and can be detected by most hidden terminals. A better self-interference cancellation technique can further improve the collision detection performance.

Another concern is the limited dynamic range of devices. Wi-Fi devices typically have a dynamic range of 40~60 dB, but the input signal power ranges from −20 dBm from nearby devices to −85 dBm from devices that are far away. If a node is receiving an arbitration preamble from a nearby device, it may not detect a weak signal from a farther device because the signal strength falls out of the dynamic range. However, as proximate devices detect each other and abort transmissions, farther devices will soon become detectable.

Since a node can start data transmission immediately if there is no collision or the BA mechanism gets involved to resolve collision in several FFT frames, the channel utilization is significantly improved. Let three USRP E110 keep sending packets to another E110. The USRP E110 uses 64 Mega samples per second (Msps) ADC and the decimation rate can be set to $2^k$. Set data rates to 0.5 Msps, 2 Msps, 4 Msps, and 8 Msps. The improvement of the proposed arbitration method over 802.11 increases as the data rate increases.

In 802.11, two transmissions may collide with each other due to the small CW. The two nodes then increase their window sizes exponentially, leading to longer backoff. The proposed arbitration method uses 8 bit binary codes. The channel access arbitration is settled down within 2*8=16 FFT frames. As analyzed below, two nodes have a probability of $$\left(\frac{1}{(2^4-2)^2}\right)^2 = \frac{1}{196^2}$$

to choose the same binary code. To obtain the same low collision probability, 802.11 needs a window size of 196. Throughput of 802.11 is improved a little bit with a larger contention window. Although the larger CW decreases the collision probability when there are multiple nodes contend for sending, it introduces great channel wastage when there is only one node that has data to send.

In the proposed arbitration method, if there is only one node intends to send, it will not observe collision during the collision probe phase. It starts data transmission 2 FFT frames after the channel is sensed to be idle. Two FFT frames consume 2*64=128 complex samples. The time used to get 128 samples decreases as the data rate increases. The collision probe takes 128/8=16 μs at 8 Msps. However, in 802.11 the slot size is fixed at 9 μs. Even with the smallest CW, the average backoff is 7.5*9=67.5 μs. With a larger CW [0, 195], the average backoff is 97.5*9=877.5 μs, which is nearly an order of magnitude greater than the collision probe.

When the data is low, the channel access backoff does not affect the efficiency of Wi-Fi significantly. Actual packet transmission dominates the air time in a successful transmission at low data rates. The throughput of 802.11 is similar to that of the proposed arbitration method at 0.5 Msps. However, when the data rate increases, the time used for transmitting a packet is reduced but the time wasted on channel access backoff stays the same. The channel access backoff soon becomes the dominant portion of a transmission. As a result, the channel access backoff becomes the major factor that prevents the high PHY data rates from translating to high throughput. Because the packet size is very small here (i.e., 100 bytes), packet transmission time is around 288 μs at 8 Msps with BPSK. The largest backoff with a contention window [0, 195] is 195*9=1755 μs, which can accommodate several packet transmissions at high data rates. The throughput of 802.11 under contention is thus higher than that can be achieved by a single node when the data rate is high. A dilemma in 802.11 is that a large window is needed when multiple nodes are contending while a small window is better for single node transmission. The proposed arbitration method, however, only introduces a short collision probe for a single node. When multiple nodes are contending, the proposed arbitration method provides low collision probability with low overhead through bitwise arbitration.

The proposed arbitration method allows high priority messages to get through the arbitration unimpeded. In this experiment, let node A and node B choose binary codes from the pool of (0xxx xxxx) and let node C choose binary codes from the pool of (1xxx xxxx). Node A and node B are placed at different distances from the receiver to examine the capture effect of radios between near-and-far terminals. First, node A was turned on and then node B was turned on. Nodes share the channel fairly with a slightly lower aggregated throughput than what is achieved by a single node. This is because the bitwise arbitration is activated and they both have to pause their transmissions for the first bit. The proposed arbitration method is not significantly biased toward node B, which is closer to the receiver. Soon node C was turned on. Node A and node B have to back off for node C. When they enter in the arbitration phase, only node C can transmit because the most significant bit of its binary code is '1'. Nodes A and B have to abort their transmissions because they detect signal when they pause their transmissions. Although the bitwise arbitration is involved after collision probe, the collision is resolved in one bit and thus the throughput is similar to what can be achieved by a single node.

In this section, the evaluation of the proposed arbitration method in larger deployments is extended with simulations. The proposed arbitration method is compared with WiFi-Nano to show advantages of the proposed arbitration method over WiFi-Nano in presence of hidden terminals. CSMA/CN is also included for addressing the hidden terminal issue. CSMA/CN uses the cross-correlation technique to notify transmitters of a collision. If a receiver detects a collision, it broadcasts a pseudo-random sequence which is referred to as the receiver's signature. Through continuously correlating for the receiver's signature in the incoming signal, nearby transmitters will notice the collision notification. All transmitters that are sending data to the receiver must abort their transmissions upon receiving the collision notification. The channel is thus freed for other useful communication.

The proposed arbitration method, WiFi-Nano, and CSMA/CN are implemented in ns-2.35. 802.11n data rates are simulated in a 20 MHz channel with 800 ns guard interval. To be fair with WiFi-Nano, we use the same wireless LAN settings as in WiFi-Nano. Multiple nodes communicate with an AP with a transmission power of 20 dBm. A path loss exponent of 2.27 is used so that the transmission range for the 6.5 Mbps modulation is 100 m. Different from WiFi-Nano settings, we do not avoid hidden terminals with planned topologies. Nodes are randomly scattered within the AP's communication range.

How the number of contending transmitters impact the achievable throughput is investigated. The number of contending transmitters is increased from 1 to 30, simulating both light contention in a home environment and heavy contention in a conference environment. All nodes generate fully backlogged CBR traffic with packet size of 1500 bytes. For full-duplex wireless communication, at least two antennas are equipped. Suppose both antennas are used for data transmission after the arbitration phase. The maximum data rate is 130 Mbps using 64 QAM modulation and 5/6 coding rate as defined in 802.11 standard.

If there is only one mode that has data to send, the throughput of the proposed arbitration method and WiFi-Nano is much higher than that of 802.11 because both the proposed arbitration method and WiFi-Nano have considerably reduced the channel access overhead. In 802.11, the average channel access backoff is 7.5×9 µs=67.5 µs with CW [0,15]. In the proposed arbitration method the channel access overhead is a duration of 2×3.2 µs=6.4 µs for collision probe. In WiFi-Nano, the average backoff time is 7.5×0.8 µs=6 µs. With a 4 µs preamble after the random backoff, the average channel access overhead is 10 µs. The great difference on channel access overhead leads to the great improvement on throughput. In addition, the improvement on throughput will be increased with higher data rates because more bits can be transmitted with the same period of time saved in channel access contention.

When more than one node is deployed, hidden terminals may appear in some scenarios. The probability of observing hidden terminals in a scenario increases with the number of deployed nodes. Simulation results are averaged over 10 random scenarios.

The adoption of tiny backoff slots introduces severe contention in presence of hidden terminals. The reason is that WiFi-Nano cannot spread out nodes' transmissions with tiny backoff slots and thus hidden terminals may keep colliding with each other. In 802.11, a collision will increase the CW exponentially. Because the backoff slot size is 9 µs, a larger CW leads to a larger backoff time interval. The large backoff time interval is able to desynchronize hidden terminals. For example, when the CW reaches the maximum value 1023, nodes' transmissions are distributed in an interval of 9.207 ms. Even when there are hidden terminals, nodes can get opportunities to deliver their packets successfully because the time used to transmit a packet of 1500 bytes is 1.846 ms at the lowest rate 6.5 Mbps. However, with the 800 ns slot size defined in WiFi-Nano, the longest backoff is 818.4 µs. Hidden terminals will keep colliding with each other. The throughput of WiFi-Nano drops quickly when more and more nodes are deployed. This is because it is more likely that some nodes are invisible to each other. CSMA/CN significantly improves the throughput of WiFi-Nano, confirming the large number of collisions introduced by the tiny backoff slot.

Here assume that a pair of transceivers is reserved for collision notification and thus a collision can be detected and notified whenever it happens. The ideal case may not hold if all antennas are used for data transmission once the correlation preamble transmission is completed in WiFi-Nano. Note that even with the help of CSMA/CN, the throughput of WiFi-Nano is still lower than that of 802.11 in presence of hidden terminals. This is because even if nodes are informed of collisions through CSMA/CN, their transmissions are still crowded in a small backoff interval. The essential problem is that nodes' transmissions cannot be spread out with the tiny 800 ns backoff slots. On the contrary, there are fewer collisions caused by hidden terminals in 802.11 because of a larger backoff time interval. The throughput gain achieved by CSMA/CN over 802.11 is thus smaller.

Because the pseudo-random preamble in WiFi-Nano can be detected at a very low SNR through correlation, two nodes that are out of carrier sensing range may detect each other's correlation preamble. Therefore, we let a node set the channel state to busy when it detects a correlation preamble. It is similar to the virtual carrier sensing mechanism known as network allocation vector (NAV) in 802.11. This variant of WiFi-Nano as WiFi-Nano-NAV is presented. With the modification, it is rare that hidden terminals will cause a collision. Collision notification has minor improvements on throughput of WiFi-Nano-NAV.

Although virtual carrier sensing helps to address the hidden terminal problem, channel utilization is decreased when all nodes abort their transmissions. In WiFi-Nano, when k nodes initiated preamble transmission in the same slot, they keep transmitting with a probability of 1/k. It is possible that all of them abort transmissions. Without virtual carrier sensing, some nodes will grab the channel soon after all nodes in the last round of contention aborted their transmissions. However, virtual carrier sensing is needed to address the hidden terminal issue. With virtual carrier sensing, all nodes have to defer their transmissions for one packet transmission duration as they set the channel state to busy when they detect a correlation preamble. As more nodes are deployed, it is more likely that several nodes initiate preamble transmission in the same slot. The throughput of WiFi-Nano-NAV decreases. Therefore, WiFi-Nano faces a dilemma in addressing hidden terminal issue. It may need virtual carrier sensing to avoid persistent collisions between hidden terminals, but virtual carrier sensing reduces channel utilization in WiFi-Nano when all nodes happen to abort their transmissions.

In the proposed arbitration method, the channel state is also set to busy when an arbitration preamble is detected. Because at least one node will survive the arbitration phase, preventing other nodes from transmission is reasonable. The channel is fully utilized. The problem is that the collision cannot be resolved if two nodes choose the same binary code. Considering that the random number range is large with binary mapping, the collision probability is low. CSMA/CN has a marginal improvement on throughput of the proposed arbitration method, indicating a low ratio of collisions to the total number of transmissions.

Both the proposed arbitration method and WiFi-Nano have greatly reduced the channel access overhead. The saved time allows nodes to transmit more data within the same period of time. The throughput gain of the proposed arbitration method and WiFi-Nano over 802.11 is expected to increase along with the data rates. CSMA/CN is not used in the following tests because CSMA/CN requires an additional pair of antennas.

When five transmitters are deployed, the throughput gain of the proposed arbitration method and WiFi-Nano-NAV over 802.11 becomes larger and larger as the data rate increases. This is because the channel access overhead of 802.11 takes a great proportion of the total time of a transmission at high data rates. When thirty transmitters are deployed, the throughput gain of WiFi-Nano-Nav over 802.11 is not significant. With thirty contending nodes, it is highly possible that all contending nodes abort their transmissions in a contention. The throughput of WiFi-Nano-NAV drops quite a lot compared to five-node scenarios. In addition, as the data rate increases, the packet transmission time decreases, hence there are more rounds of contentions in the same period of time. More rounds of contentions imply more collisions. The throughput gap between WiFi-Nano-NAV with 5 nodes and WiFi-Nano-NAV with 30 nodes becomes larger and larger.

With thirty transmitters deployed, the throughput of the proposed arbitration method drops a little bit because the probability that two nodes choose the same binary code increases, but the throughput achieved by the proposed arbitration method is still much higher than that can be achieved by WiFi-Nano-NAV and 802.11. In both WiFi-Nano-NAV and 802.11, the CW starts from the minimum value. If more than one node defers the transmission to the same slot, there is a collision in 802.11 and there may be no transmission in WiFi-Nano-NAV. Although a collision in the proposed arbitration method incurs the same cost of one packet transmission duration, the proposed arbitration method has much lower collision probability with a much larger random number range in the frequency domain. Therefore, the proposed arbitration method provides a great throughput improvement over WiFi-Nano and 802.11.

When a collision happens, many off-the-shelf transceivers are able to decode one of the colliding packets depending on the relative SINR at the receiver. The capture effect unfairly favors nodes that are closer to an AP. However, if collisions can be detected and resolved before data transmission, unfairness caused by capture effect of radios can be reduced.

When more and more nodes are deployed, the collision probability increases. If a node is close to the AP, its packet may be decoded in a collision. On the contrary, if a node is at the edge of the network, its packets may never be captured in a collision. Therefore, capture effect of radios helps to increase throughput but introduces unfairness between near-and-far terminals. The fairness in 802.11 decreases quickly. CSMA/CN terminates a collision early. As a result, there are more rounds of contentions in the same period of time. The unfairness between near-and-far terminals is severer.

Both the proposed arbitration method and WiFi-Nano resolve collisions before data transmission, near-and-far terminals get equal chances to deliver their packets. However, if hidden terminals ignore the collision resolution, both throughput and fairness will be compromised. In WiFi-Nano, the correlation preamble can be detected at a very low SNR. Collisions are likely to be resolved before data transmission and only one node starts data transmission. However, because data transmission has no unique feature in the time or frequency domain, it cannot be detected at a low SNR. Since WiFi-Nano uses tiny backoff slots, a hidden terminal will soon check the channel again and sense that the channel is idle. The hidden terminal may start a transmission and cause a collision. Only nodes that are close to the AP may have success in data transmission. The fairness index of WiFi-Nano drops quickly. With virtual carrier sensing, once collision is resolved, contending nodes will back off long enough to allow the ongoing transmission to complete. The fairness index of WiFi-Nano-NAV and the proposed arbitration method is thus high, both are close to 1.

When data rates increase, a packet transmission can be completed in a shorter time. Because the backoff time interval in 802.11 is large, a short transmission is unlikely to be corrupted by a latter initiated transmission. Even if a node is far away from the AP, it has some opportunities to deliver its packets successfully. Therefore, the fairness of 802.11 is improved with higher data rates. The proposed arbitration method and WiFi-Nano-NAV have resolved collisions before data transmission. The capture effect of radios thus does not play an important role in affecting fairness.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for detecting collisions in a multicarrier wireless network, comprising:
   detecting, by a first communication device, an idle condition on a data channel of a shared transmission medium, where the data channel is divided into a plurality of subcarrier frequencies;
   generating, by the first communication device, a collision probe from a binary codeword comprised of k bits, where one or more values of the binary codeword correlate to a signal magnitude of zero;
   transmitting, by the first communication device, the collision probe over the data channel, such that each bit of the binary codeword is transmitted using a different subcarrier frequency of the data channel;
   receiving, concurrently with the transmission of the collision probe, an incoming signal from a second communication device, the incoming signal received via the data channel by the first communication device; and
   identifying, by the first communication device, a collision on the data channel based on presence of a signal on a subcarrier frequency of the incoming signal whose corresponding bit value in the collision probe is zero.

2. The method of claim 1 wherein generating a collision probe further comprises
   selecting a random number from a range of values; and
   translating the random number to the binary codeword using a binary code, where a bit value of one correlates to a signal magnitude greater than zero, a bit value of zero correlates to a signal magnitude of zero and k is the number of subcarrier frequencies.

3. The method of claim 1 wherein transmitting the collision probe further comprises
   modulating each of the plurality of subcarriers frequencies with a different bit from the binary codeword using inverse fast Fourier transform.

4. The method of claim 1 wherein identifying a collision on the data channel further comprises
   demodulating each of the subcarrier frequencies of the incoming signal into a bit value of a binary codeword;
   comparing the bit values from the incoming signal to the bit values of the collision probe; and
   identifying a collision on the data channel when a bit value from the incoming signal is one and the corresponding bit value of the collision probe is zero.

5. The method of claim 1 further comprises arbitrating between the first communication device and the second communication device in response to identifying a collision on the data channel.

6. The method of claim 5 wherein arbitrating further comprises
   (a) selecting, by the first communication device, one bit value from the binary codeword, where the bit value is selected from the binary codeword in a predefined order;
   (b) pausing, by the first communication device, transmission over the data channel for a period of time when the selected bit value is zero;
   (c) retransmitting, by the first communication device, the collision probe over the data channel during the period of time when the selected bit value is one; and
   (d) listening, by the first communication device, for a signal on the data channel during the period of time.

7. The method of claim 6 further comprises:
   (e) receiving, by the first communication device, a second signal over the data channel from the second communication device;
   (f) determining, by the first communication device, a match between the selected bit value and a corresponding bit in the received second signal;
   (g) selecting, by the first communication device, another bit value from the binary codeword and repeating steps (b)-(g), where the selection of another bit is in response to determining a match and the another bit value is selected from the binary codeword in the predefined order.

8. The method of claim 6 further comprises
   initiating, by the first communication device, data transmission over the data channel when the selected bit value is one and a signal is not received via the data channel by the first communication device.

9. The method of claim 5 further comprises
   aborting, by the first communication device, data transmission over the data channel when the selected bit value is zero and a signal is received via the data channel by the first communication device.

10. A method for detecting collisions in a multicarrier wireless network, comprising:
    selecting a random number from a range of values; and
    translating the random number to a binary codeword comprised of k bits, where k is a number of subcarrier frequencies in a data channel, a bit value of one correlates to a signal magnitude greater than zero and a bit value of zero correlates to a signal magnitude of zero;
    mapping each bit of the binary codeword to a different subcarrier frequency of the data channel, where the data channel is divided into k subcarrier frequencies;
    modulating signals in each of the subcarriers frequencies of the data channel using a bit value from the mapped bit of the binary codeword;
    transmitting the modulated signals over the data channel by a first communication device;
    receiving, concurrently with the transmission of the modulating signals, an incoming signal from a second communication device, the incoming signal received via the data channel by the first communication device; and
    identifying, by the first communication device, a collision on the data channel based on presence of a signal on a subcarrier frequency of the incoming signal whose corresponding bit value is zero.

11. The method of claim 10 further comprises transmitting the modulated signal over the data channel upon detecting an idle condition on the data channel.

12. The method of claim 10 further comprises modulating signals in each of the subcarrier frequencies using inverse fast Fourier transform.

13. The method of claim 10 further comprises transmitting data over the data channel using orthogonal frequency-division multiplexing.

14. A channel access method for devices in a multicarrier wireless network, comprising:
    transmitting, using a first antenna of a first communication device, a collision probe over a data channel, where the data channel is divided into a plurality of subcarrier frequencies and the collision probe is derived from a binary codeword comprised of k bits and each bit of the binary codeword is transmitted using a different subcarrier frequency of the data channel;

listening, using a second antenna of the first communication device, for a signal on the data channel concurrently with the transmission of the collision probe;

comparing, by the first communication device, a collision probe received on the data channel from another communication device with the collision probe transmitted on the data channel by the first communication device;

detecting, by the first communication device, a collision on the data channel based on the comparison step; and arbitrating, by the first communication device, access to the data channel upon detecting a collision on the data channel, wherein detecting the collision on the data channel includes demodulating each of the subcarrier frequencies of an incoming signal received by the second antenna into a bit value of a binary codeword;

comparing each of the bit values from the incoming signal to the bit values of the collision probe transmitted on the data channel; and identifying a collision on the data channel when a bit value from the incoming signal is one and the corresponding bit value of the collision probe transmitted on the data channel is zero.

15. The method of claim 14 wherein transmitting a collision probe further comprises selecting a random number from a range of values; and translating the random number to the binary codeword using a binary code;

mapping each bit of the binary codeword to a different subcarrier frequency of the data channel;

modulating signals in each of the subcarriers frequencies of the data channel using a bit value from the mapped bit of the binary codeword; and transmitting the modulated signals over the data channel.

16. The method of claim 15 further comprises modulating signals in each of the plurality of subcarriers frequencies using inverse fast Fourier transform.

17. The method of claim 14 wherein arbitrating further comprises
  (a) selecting, by the first communication device, one bit value from the binary codeword, where bits are selected from the binary codeword in a predefined order;
  (b) pausing, by the first communication device, transmission over the data channel for a period of time when the selected bit value is zero;
  (c) retransmitting, by the first communication device, the collision probe over the data channel during the period of time when the selected bit value is one; and
  (d) listening, by the first communication device, for a signal on the data channel during the period of time.

18. The method of claim 17 further comprises:
  (e) receiving, by the first communication device, a second signal over the data channel from the another communication device;
  (f) determining, by the first communication device, a match between the selected bit value and a corresponding bit in the received second signal;
  (g) selecting, by the first communication device, another bit value from the binary codeword and repeating steps (b)-(g), where the selection of another bit is in response to determining a match and the another bit value is selected from the binary codeword in the predefined order.

19. The method of claim 17 further comprises
initiating, by the first communication device, data transmission over the data channel when the selected bit value is one and a signal is not received via the data channel by the first communication device.

20. The method of claim 17 further comprises
aborting, by the first communication device, data transmission over the data channel when the selected bit value is zero and a signal is received via the data channel by the first communication device.

* * * * *